United States Patent [19]

Fan et al.

[11] Patent Number: 5,091,110
[45] Date of Patent: Feb. 25, 1992

[54] METHOD OF MAKING LANTHANUM CERIUM TERBIUM PHOSPHATE PHOSPHOR

[75] Inventors: Albert K. Fan; Anthony F. Kasenga; Douglas R. Ginter, all of Towanda, Pa.

[73] Assignee: GTE Products Corporation, Stamford, Conn.

[21] Appl. No.: 522,617

[22] Filed: May 14, 1990

[51] Int. Cl.$^5$ .............................................. C09K 11/81
[52] U.S. Cl. .............................................. 252/301.4 P
[58] Field of Search .................................. 252/301.4 P

[56] References Cited

U.S. PATENT DOCUMENTS

| | | | |
|---|---|---|---|
| 3,525,698 | 8/1970 | Leto et al. | 252/301.4 P |
| 3,634,282 | 1/1972 | Denis et al. | 252/301.4 P |
| 3,668,142 | 6/1972 | Luckey | 252/301.4 P |
| 3,925,674 | 12/1975 | D'Silva et al. | 252/301.4 P |
| 4,423,349 | 12/1983 | Nakajima et al. | 313/487 |

FOREIGN PATENT DOCUMENTS

| | | | |
|---|---|---|---|
| 57-133182 | 8/1982 | Japan | 252/301.4 P |
| 59-179578 | 10/1984 | Japan | 252/301.4 P |

*Primary Examiner*—Jack Cooper
*Attorney, Agent, or Firm*—Elizabeth A. Levy

[57] ABSTRACT

A method of making a lanthanum cerium terbium phosphate phosphor involves the coprecipitation of a rare earth nitrate solution with diammonium hydrogen phosphate to form a lanthanmum cerium terbium phosphate, combining the phosphate with a fluxing compound, and firing the resulting mixture to form the phosphor.

6 Claims, No Drawings

METHOD OF MAKING LANTHANUM CERIUM TERBIUM PHOSPHATE PHOSPHOR

TECHNICAL FIELD

This invention relates to a process for making a lanthanum cerium terbium phosphate phosphor for use in fluorescent lamps.

BACKGROUND ART

U.S. Pat. No. 4,423,349 to Nakajima et al discloses two methods of making the above phosphor. In one method, carbonates of lanthanum, cerium and terbium are formed at 70° C. and then reacted with phosphoric acid at 75° C. to form a lanthanum cerium terbium phosphate. The phosphate is then fired at 1150° C. for 75 minutes to form the phosphor.

In the other method, a coprecipitate of lanthanum cerium terbium oxalate is formed at 80° C. and decomposed at 800° C. to form a single-phase, mixed valence state lanthanum cerium terbium oxide. Diammonium phosphate is added to the oxide, and the mixture is then decomposed at 700° C. to form a lanthanum cerium terbium phosphate. The phosphate is then crushed and fired at 1200° C. for 4 hours to form the phosphor. Boron oxide or ammonium borate as a fluxing agent may be added before the firing step to promote the reaction and improve brightness.

SUMMARY OF THE INVENTION

In accordance with the invention there is provided a method of making lanthanum cerium terbium phosphate phosphor comprising the steps of forming a first aqueous solution of lanthanum nitrate, terbium nitrate and cerium nitrate, forming a second aqueous solution of diammonium hydrogen phosphate, combining the first and second solutions to coprecipitate a lanthanum cerium terbium phosphate having the composition $La_xCe_yTb_zPO_4$ wherein $x=0.39$ to $0.73$, $y=0.17$ to $0.45$ and $z=0.10$ to $0.17$, combining the coprecipitated lanthanum cerium terbium phosphate with a fluxing compound to form a uniform mixture, and firing the mixture to form the phosphor.

BEST MODE FOR CARRYING OUT THE INVENTION

For a better understanding of the present invention, together with other and further objects, advantages and capabilities thereof, reference is made to the following disclosure and appended claims.

The lanthanum and terbium raw materials may be lanthanum oxide and terbium oxide. Lanthanum oxide is added to concentrated nitric acid to form lanthanum nitrate, which is then preferably diluted. Terbium oxide is added to concentrated nitric acid to form terbium nitrate solution, which is then preferably diluted. The diluted lanthanum nitrate solution and the diluted terbium nitrate solution are then combined to form a single rare earth solution. Hydrated cerium nitrate is then added to the rare earth solution. The molar ratio of the rare earth elements in the rare earth solution is thus about x mole La:y mole Ce:z mole Tb where $x=0.39$ to $0.73$, $y=0.17$ to $0.45$ and $z=0.10$ to $0.17$. The molar ratio of the rare earth elements is preferably about 0.6 mole La:0.225 mole Ce:0.165 mole Tb.

Diammonium hydrogen phosphate is typically provided in an amount in excess of the amount needed to react with the rare earth compounds. Because diammonium hydrogen phosphate decomposes at a relatively low temperature, well below the firing temperature of the desired phosphor, excessive amounts of it must be provided to secure a sufficient amount of the phosphate for reaction with the rare earth compounds to form the phosphor.

The rare earth nitrate solution and the diammonium hydrogen phosphate solution are coprecipitated under controlled conditions to form a lanthanum cerium terbium phosphate. The coprecipitation process takes place at between 80° C. and 90° C. The ratio of the rare earth solution reactant to the diammonium hydrogen phosphate solution reactant should be kept constant for the coprecipitation reaction to occur. This can be accomplished, for example, by causing the reactant solutions to be added to the heated deionized water simultaneously and at the same rate.

The coprecipitated lanthanum cerium terbium phosphate is then digested for a sufficient time to produce phosphor crystals. The digestion is preferably carried out at 80°–90° C., and most preferably at 85° C., for one hour. The digested phosphate is then washed with hot deionized water, filtered and dried.

The dried phosphate is thoroughly blended with between 0.5 and 5.0 weight percent of a fluxing compound and then fired to form the phosphor. The fluxing compound can be, for example, sodium hydrogen phosphate. Firing occurs in covered silica boats in a slightly reducing atmosphere at between 1150°–1300° C. for about 1.5 to 4 hours.

After firing, the phosphor is washed in nitric acid to remove any residual sodium compound impurities.

The following non-limiting example is presented.

EXAMPLE 1

Rare earth nitrate solutions were prepared as follows: 500 grams of lanthanum oxide, $La_2O_3$, were dissolved in 600 ml of concentrated nitric acid, $HNO_3$. The volume was increased to 2000 ml with deionized water. Five hundred grams of terbium oxide, $Tb_4O_7$, were dissolved into 1000 ml of hot concentrated nitric acid. The volume was increased to 2000 ml with deionized water. A mixed rare earth solution was prepared by combining 938.5 ml of the lanthanum nitrate solution, $La(NO_3)_3$, and 296.1 ml of the terbium nitrate solution, $Tb(NO_3)_3$, in a 4000 ml beaker. Added to this mixture was 234.48 grams of hydrated cerium nitrate, $Ce(NO_3)_3.6H_2O$. The total volume of the mixed rare earth solution was increased to 2000 ml with deionized water. The molar ratio of the rare earth elements in the resulting solution was 0.6 mole La:0.225 mole Ce:0.165 mole Ce. To this solution was added 380.3 grams of diammonium hydrogen phosphate, $(NH_4)_2HPO_4$, in 2000 ml of deionized water. This amount of diammonium phosphate is in excess by 10%–30% over the amount needed stoichiometrically to form a lanthanum cerium terbium phosphate precipitate.

To precipitate the lanthanum cerium terbium phosphate phosphor, 3000 ml of deionized water was heated to a temperature of 80°–90° C. and stirred to maintain this temperature throughout the precipitation process. The mixed rare earth solution and the diammonium phosphate solution were added simultaneously from two separately controlled funnels at a rate of two drops per second to the hot deionized water. After thirty minutes the rate of addition was increased so that both solutions were completely added within 2–3 hours. The addition rate of both solutions was kept constant. After both solutions were completely added to the hot deionized water, the resulting precipitate was digested at 85° C. for one hour with constant stirring. The digested precipitate was filtered and washed with 4000 ml of hot deionized water and dried overnight at 120° C. The dry cake was crushed with $\frac{1}{4}''$ cylindrical grinding media for 30 minutes and sieved through a 20 mesh screen.

Four hundred fifty grams of the resulting powder were blended with nine grams, or 2.0 weight percent, of sodium hydrogen phosphate, $Na_2HPO_4$, with $\frac{1}{4}''$ round alumina grinding media for 15 minutes. The blended mixture was screened and loaded into silica boats and covered. The material was fired at 1200° C. for 3 hours in a 95% nitrogen/5% hydrogen atmosphere to form the lanthanum cerium terbium phosphate phosphor. The fired Phosphor cake was cooled, crushed and washed in a 2% nitric acid solution for 4 hours, filtered, rinsed in hot deionized water, dried overnight at 120° C. and sifted through a 200 mesh stainless steel screen.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of making lanthanum cerium terbium phosphate phosphor, comprising the steps of:
   (a) forming an first aqueous solution of lanthanum nitrate, terbium nitrate and cerium nitrate;
   (b) forming a second aqueous solution of diammonium hydrogen phosphate;
   (c) adding said first and second solutions simultaneously and at the same rate to deionized water that has been heated and maintained at a temperature of between 80° to 90° C. to coprecipitate a lanthanum cerium terbium phosphate having the composition $La_xCe_yTb_zPO_4$ wherein $x=0.39$ to 0.73, $y=0.17$ to 0.45 and $z=0.10$ to 0.17 and digesting the coprecipitated phosphate for one hour at this temperature;
   (d) combining said coprecipitated lanthanum cerium terbium phosphate with about 0.5 to about 5.0 weight percent $Na_2HPO_4$ to form a uniform mixture; and
   (e) firing said mixture at about 1150° C. to about 1300° C. for about 1.5 to about 4 hours in a reducing atmosphere of 95% nitrogen/5% hydrogen to form said phosphor.

2. The method of claim 1 where in said $La_xCe_yTb_zPO_4$ coprecipitate is 0.6, y is 0.225 and z is 0.165.

3. The method of claim 1 wherein said diammonium hydrogen phosphate is provided in an amount of 10% to 30% in excess of that amount needed to form said lanthanum cerium terbium phosphate phosphor.

4. The method of claim 1 wherein said coprecipitated phosphate is digested at 85° C.

5. The method of claim 1 wherein said firing occurs at 1200° C. for about 3 hours.

6. The method of claim 1 wherein said $Na_2HPO_4$ is provided in an amount of about 2.0 weight percent.

* * * * *